May 9, 1961  R. E. TISCH  2,983,533
SEALING RING
Filed Jan. 22, 1957
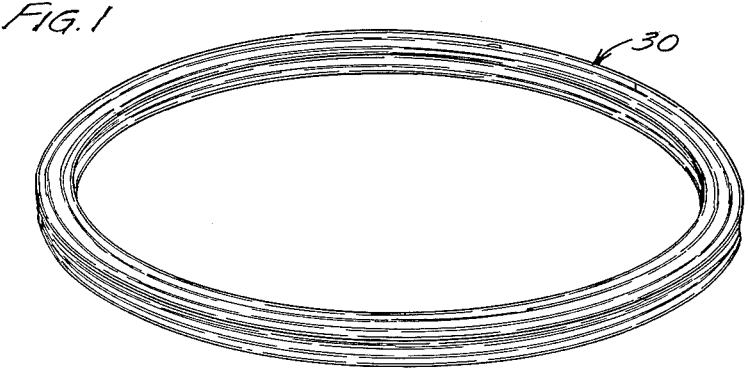
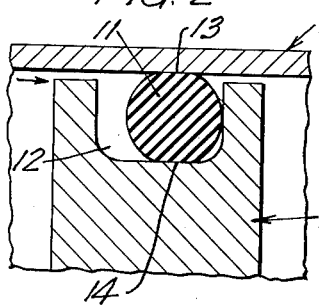
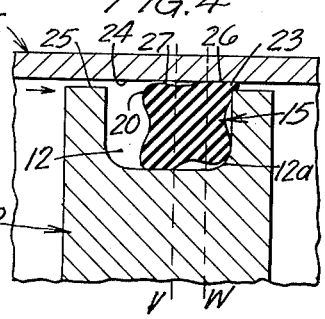
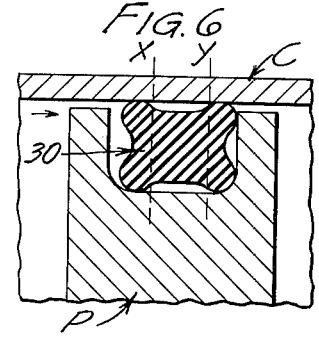
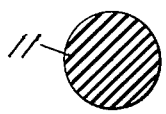
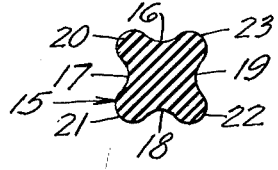
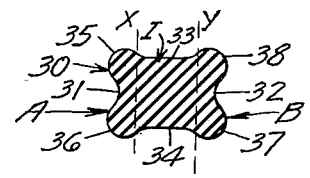
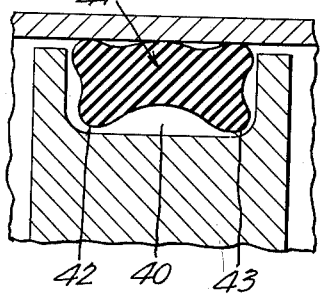
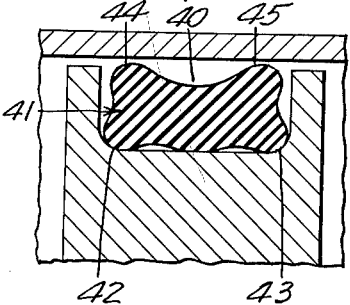
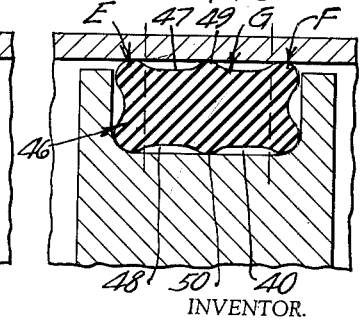
INVENTOR.
RICHARD E. TISCH
BY Williamson Schroeder Adams & Meyers
ATTORNEYS United States Patent Office 2,983,533
Patented May 9, 1961

2,983,533
SEALING RING
Richard E. Tisch, Minneapolis, Minn., assignor to A-P-D Co., Minneapolis, Minn., a corporation of Minnesota
Filed Jan. 22, 1957, Ser. No. 635,485
5 Claims. (Cl. 288—19)

This invention relates to sealing rings. More particularly it relates to sealing rings uniquely designed to provide a better fluid pressure seal within existing sealing grooves which were installed in various machines for use in conjunction with a sealing ring which is circular in cross-sectional configuration and is commonly known in the trade as an O-ring.

For a considerable number of years it has been common practice when wanting to perfect a fluid pressure seal between two members having relative movement, to install or form a groove in one of these members and install a sealing ring known as an O-ring within the groove in order to provide the desired fluid pressure seal. An O-ring, in the sense in which the term is commonly used, is an angular sealing ring generally formed of rubber throughout and circular in cross-sectional configuration. It has been assumed by industrial designers that, in order for an O-ring to function properly, the groove must be substantially wider than it is deep so that the sealing ring is free to move at least somewhat axially. Such grooves generally have a width at least one third greater than the estimated axial dimension of the installed O-ring. As a result, there is an extremely large number of machines in existence and being presently used in industry which have grooves that are not as deep as they are wide.

It was found that an O-ring for many situations is not the ideal sealing ring for a number of reasons. One of the chief reasons is that an O-ring in use twists longitudinally and finally wears itself out and/or ruptures, thereby destroying the seal and the ring itself. It was found that if a sealing ring was made of generally square cross-sectional configuration with recessed sides, it would outlast and out-perform an O-ring when tested or used in the same groove which was designed for an O-ring. As a result, annular sealing rings of generally square cross-sectional configuration have become popular with the trade as replacements for O-rings, the cross-sectional dimensions of this generally square ring being approximately equal to the cross-sectional diameter of the O-ring which it replaced.

I have discovered, however, that a sealing ring of generally square cross-sectional configuration is not the sealing ring of optimum design for use in such a groove and that as a result, even such rings do not wear as long as is desirable and feasible and the seals which they provide are not as efficient as possible. I have discovered that such a ring tends to rock, roll and twist when the movement between the moving parts in one of which the groove is formed is transverse of the groove. Such rocking, rolling and twisting movement of the ring causes it to wear unnecessarily and eventually fail to seal properly as a result thereof. I have discovered that the rocking, rolling and twisting movement is the result of the ring tilting about its longitudinal axis and sliding up the radiused bottom corner of the groove with the result that the ring, taken cross-sectionally is askew within the groove and wedges between the moving surfaces. It is standard machining practice to radius the bottom corners of such grooves and hence, all such groove corners have at least some radius. The convex inner corners of a sealing ring of square cross-section will radially slide up such a radius and cause the ring to wedge, twist, rock and roll within the groove with consequent excessive wear.

I have discovered, however, that the problem outlined in the immediately preceding paragraph has been solved by making the sealing ring of a particular cross-sectional configuration. I have found that by making the sealing ring of generally rectangular cross-sectional configuration with its axial dimensions, speaking cross-sectionally, substantially greater than its radial dimensions, I can reduce and in fact substantially eliminate the tendency of the ring to rock, roll and twist within such a groove. As a result, I have thusly formed a highly improved sealing ring which has a much longer useful life and which perfects a better seal. In other words, I have found that by elongating axially the material of the sealing ring which connects the end or sealing portions of the ring, the tendency of the ring to twist, rock or roll within the groove is substantially eliminated and consequently there is less wedging between the moving surfaces and much less attendant excessive wear.

It is a general object of my invention to provide a novel and improved sealing ring of simple and inexpensive construction.

A more specific object is to provide a novel and improved sealing ring which can be manufactured simply and inexpensively and can be utilized in grooves designed for O-rings to provide a more perfect seal than rings heretofore known.

Another object is to provide a novel and improved sealing ring which when utilized in grooves designed for use in conjunction with rings having a circular cross-sectional configuration, will preclude rolling, rocking and twisting movement of the ring during relative movement of the sealing surfaces transversely of the groove and will therefore have a longer useful life.

Another object is to provide a novel and improved sealing ring which when utilized in grooves designed for use in conjunction with sealing rings having a circular cross-sectional configuration will preclude wedging of the ring during relative movement of the sealing surfaces transversely of the groove and will, therefore, have a longer useful life and will provide a more effective fluid pressure seal between the surfaces.

Another object is to provide a novel and improved sealing ring which when utilized in grooves designed for use with sealing rings having a circular cross-sectional configuration will prevent rocking, rolling and twisting movement of the ring within the groove and will prevent collapse of the intermediate portions of the ring when the groove is unusually wide or the ring is subjected to unusually high fluid pressures.

These and other objects and advantages of my invention will more fully appear from the following description, made in connection with the accompanying drawings, wherein like reference characters refer to the same or similar parts throughout the several views, and in which:

Fig. 1 is a perspective view of one embodiment of my invention;

Fig. 2 is a vertical sectional view of a groove formed in one of two relatively moving members with an O-ring disposed within the groove to provide the desired seal, the direction of application of fluid pressure and consequent movement of the piston being indicated by an arrow;

Fig. 3 is a cross-sectional view of an O-ring prior to installation in a groove such as is shown in Fig. 2;

Fig. 4 is a sectional view showing a ring of generally square cross-sectional configuration installed within a groove of the same size as that shown in Fig. 2;

Fig. 5 is a cross-sectional view of the ring shown in Fig. 4 prior to being installed in that groove;

Fig. 6 is a sectional view showing a sealing ring constructed in accordance with my invention installed within a sealing ring groove of the same size of the groove in Fig. 2;

Fig. 7 is a sectional view of the sealing ring shown in Fig. 6 prior to installation;

Fig. 8 is a cross-sectional view of a sealing groove of unusual width of a second embodiment of my invention installed therein, the view illustrating what may occur under such circumstances and especially when unusually high fluid pressures are involved;

Fig. 9 is a cross-sectional view of the structure shown in Fig. 8 illustrating a further possible difficulty which may be encountered with such an unusually wide groove and especially when unusually high fluid pressures are involved; and Fig. 10 is a cross-sectional view of a modified form of my invention designed to solve the problems illustrated in Figs. 8 and 9.

For the purpose of more adequately understanding the problem, the drawings illustrate in Figs. 2 and 3 the type of ring known as an O-ring before and after installation. It will be noted by reference to Fig. 3 that prior to installation, the O-ring 11 is circular in cross-sectional configuration. It will also be noted by reference to Fig. 2 that when the O-ring 11 is installed within the groove 12 which has heretofore been provided for such rings, the ring is slightly deformed cross-sectionally as at 13 and 14. This is a result of the groove 12 being formed so that it is not as deep as the cross-sectional diameter of the ring 11. Further reference to Fig. 2 shows that such grooves are conventionally approximately one third greater in width than the estimated axial dimension of the installed ring. As a result, an extremely large number of machines today have sealing grooves formed therein which are substantially wider than their depth.

Figs. 4 and 5 have been included to further illustrate the state of the art and to depict clearly the present problem. As stated hereinbefore, it has been found that a sealing ring having a generally square cross-sectional configuration provides a better seal than an O-ring when disposed within the groove which was originally designed for the O-ring, the dimensions of the generally square sealing ring being approximately equal to the cross-sectional diameter of the O-ring. The sealing ring 15 shown in Fig. 5 has been found to be particularly effective in providing a good fluid pressure seal. It will be noted that the ring 15 has concavely shaped sides 16, 17, 18 and 19. It also has convexly shaped lobes 20, 21, 22 and 23 at its corner portions. It can be seen that the curvature of the lobes at the corners merge tangentially with the concave curvature of the sides of the ring. When initially installed, the sealing ring 15 will provide points of sealing contact at each of the corner portions. It has been found, however, as can be seen by reference to Fig. 4, that although such a ring 15 provides a more effective seal, it still is not the ultimate in a sealing ring for it tends to rock, roll and twist when the relative movement between the parts is transversely of the groove 12. The moving members in Figs. 2 and 4 are best considered as a piston P and a cylinder C. The arrows indicate the direction of the pressure and piston travel.

Fig. 4 illustrates how the sealing ring 15 twists and wedges between the bottom of the groove 12 and the opposed sealing surfaces of the cylinder C. To facilitate reference thereto, the cylinder C may be referred to as having an opposed sealing surface 24 and the piston P may be referred to as having the adjacent opposed sealing surface 25. Study of Fig. 4 will make it readily apparent that the ring 15 will tend to rock and roll within the groove 12 during reciprocating movement of the piston P. It should be noted that the lower right-hand corner of the ring 15 as viewed in Fig. 4 has ridden upwardly on the radiused bottom corner 12a of the groove 12. This riding upwardly on the radiused corner of the groove causes the ring 15 to wedge as shown in Fig. 4 and thereby causes excessive wear at the point indicated as 26 and breaks the seal at the corner lobe 20 as indicated at 27. Thus it can be seen that excessive wear results on the corner lobe 23 at 26 and an imperfect seal is provided, for the seal is provided only at the corner lobe 23 rather than at both corners 20 and 23.

Fig. 1 is a perspective view of an embodiment of my sealing invention which comprises a sealing ring, which is as best shown in Figs. 6 and 7 generally rectangular in cross-section with its axial dimension substantially greater than its radial dimension. My sealing ring indicated generally as 30 as best shown in Figs. 6 and 7, has a pair of axially spaced concavely shaped sides 31 and 32 and a pair of radially spaced sides 33 and 34 which are flat and extend parallel to the axis of the ring. It will be noted that the radially spaced sides 33 and 34 are relatively long and that there are convexly shaped lobes 35, 36, 37 and 38 at each of the corners of the ring 30.

To best understand the invention, it is convenient to refer to the ring 30 as having a pair of end sections indicated generally as A and B and an intermediate portion indicated generally as I. The end portions A and B are comprised of the portions of the ring disposed axially outwardly of the vertical lines X and Y which are drawn through the points where the curvature of the exterior of the ring reverses from convex to concave. In other words, the end portions include the corner lobes and the axially spaced side therebetween whereas the intermediate portion includes the portion of the ring which connects or acts as a coupling between the two end portions A and B.

Comparison of Fig. 4 and Figs. 6 and 7 immediately points up the fact that in my ring the intermediate or coupling portion is substantially longer than the intermediate or coupling portion between the end portions of the ring 15 shown in Figs. 4 and 5. The length of the coupling portion in the ring 15 can best be noted by observation of the vertical lines V and W in Fig. 4. By substantially elongating the intermediate or coupling portion, I have provided a ring which precludes the twisting and rolling within the groove and prevents the wedging shown in Fig. 4. Since the ring 30 as shown in Fig. 6, mechanically resists the tendency to rock, roll or twist and will be prevented by the radial length thereof from wedging, the wear on each outer convexity of the ring will be substantially equal and not excessive. Furthermore, the seal will be maintained at each of the corners so that a more effective seal is provided. Consequently, my sealing ring 30 will outlast and out-perform sealing rings heretofore known.

Figs. 8 and 9 show a groove 40 which is unusually wide. When a sealing ring of rectangular cross-sectional configuration as disclosed by me herein, is formed to fit such a groove, the intermediate portion becomes so long that at unusually high pressures there may be danger of collapse thereof as illustrated in Figs. 8 and 9. It will be noted that in Figs. 8 and 9, the sealing ring 41 is shaped like the sealing ring 30 except that the intermediate portion is longer, the axial dimension of the ring being slightly less than the width of the groove as is preferable. However, under unusual pressures the fluid pressure may get beneath the medial portion of the ring 41 and force it upwardly as shown in Fig. 8, thereby breaking the seal at the corner lobes 42 and 43 so that failure of the seal would result. Another possibility would be that the fluid pressure would force the intermediate portion of the ring 43 downwardly as shown in Fig. 9 causing the seal to be broken at the convex corner lobes 44 and 45. To preclude this possibility I have designed a modified form of the ring 30 which is shown in Fig. 10 and indicated generally as 46. It will be noted that the same groove 40 is shown in each of the Figs. 8, 9 and 10.

The ring 46 is of generally rectangular cross-sectional configuration and has end portions E and F which correspond to the end portions A and B of the ring 30. The intermediate portion, however, indicated as G does not have its radially spaced sides 47 and 48 flat as is the case with the ring 30. I have found that it is preferable to provide a buffer element or lobe such as 49 and 50 intermediate the ends (taken axially) of the intermediate portion. Such a lobe 49 and 50 prevents the collapse of the intermediate portion in the manner shown in Figs. 8 and 9 and provides an improved and effective seal which will maintain essentially the orientation within the groove 40 as shown in Fig. 10.

From the above it can be readily seen that I have provided a sealing ring which because of its unique cross-sectional configuration will outlast and out-perform sealing rings heretofore known when installed within a sealing ring groove designed for use in conjunction with an O-ring. It is to be understood, of course, that my sealing ring is made throughout of a resilient flowable material such as rubber just as the rings shown in Figs. 2–5 are formed of such a material. It is conventional practice in the trade to form sealing rings from such material and no claim is made by me to that feature.

It will, of course, be understood that various changes may be made in the form, details, arrangement and proportions of the parts without departing from the scope of my invention which consists of the matter shown and described herein and set forth in the appended claims.

What is claimed is:

1. A sealing device comprising a continuously formed ring-like member made of a resilient flowable material throughout and adapted to be fitted into a sealing groove of ring-like configuration formed in one of a pair of opposed surfaces, said ring-like member being generally rectangular in cross-sectional configuration and having a pair of axially spaced end portions and a relatively long axially extending intermediate portion connecting said end portions, each of said end portions having a pair of radially spaced corners at which there is disposed a convexly shaped lobe and a recessed side disposed therebetween, the corresponding lobes of said end portions extending outwardly and radially beyond said intermediate portion and being substantially semi-circular convexly curved in shape in their free form, one of said lobes being adapted to contact the bottom of such a groove and the other to contact the opposed sealing surface, said member being of substantially greater axial cross-sectional dimension than radial cross-sectional dimension whereby substantially all rocking, rolling and twisting movement normally caused in such a member when placed within such a groove formed in one of a pair of opposed surfaces having relative motion axially of the groove to provide a seal therebetween, is precluded.

2. A sealing device comprising a continuously formed ring-like member made of a resilient flowable material throughout and adapted to be fitted into a sealing groove of ring-like configuration, said ring-like member being generally rectangular in cross-sectional configuration and having four recessed sides and a lobe at each of the corners between adjacent sides, the exterior surface of said lobes in their free form being smoothly contoured and arcuately convex in shape across the entire surface, the entire surface of said member between said lobes being smoothly contoured and concave in shape, said member being substantially greater in one of its cross-sectional dimensions than in its other cross-sectional dimension whereby substantially all rocking, rolling and twisting movement of such a member when placed within a relatively wide groove formed in one of a pair of opposed surfaces having relative motion therebetween axially of the groove to provide a seal therebetween, is precluded.

3. A sealing device comprising a continuously formed ring-like member made of a resilient flowable material throughout and adapted to be fitted into a sealing groove of ring-like configuration, said ring-like member being generally rectangular in cross-sectional configuration and having four generally concavely shaped recessed sides and a lobe at each of the corners between adjacent sides, the exterior surfaces of said lobes in their free form being smoothly contoured and continuously arcuate in shape, said member being of substantially greater axial cross-sectional dimension than radial cross-sectional dimension whereby substantially all rocking, rolling and twisting movement of such a member, when placed within a relatively wide groove formed in one of a pair of opposed surfaces having relative motion axially of the groove to provide a seal therebetween, is precluded.

4. A sealing device comprising a continuously formed ring-like member made of a resilient flowable material throughout and adapted to be fitted into a sealing groove of ring-like configuration, said ring-like member being generally rectangular in cross-sectional configuration and having in its free form a pair of axially spaced radially extending sides and two radially spaced pairs of smoothly contoured arcuately and convexly shaped lobes, the lobes of each of said pairs being disposed at one of the corners of said member between adjacent sides and extending outwardly beyond the adjacent sides, the axial distance between the central portions of said radially extending sides being substantially greater than twice the distance one of said lobes extends axially outwardly beyond the central portion of the associated adjacent radially extending side, said member being of substantially greater axial cross-sectional dimension than its radial cross-sectional dimension whereby substantially all rocking, rolling and twisting movement of such a member when placed within a relatively wide groove formed in one of a pair of opposed surfaces having relative motion axially of the groove to provide a fluid pressure seal therebetween, is precluded.

5. A sealing device comprising a continuously formed ring-like member made of a resilient flowable material throughout and adapted to be fitted into a sealing groove of ring-like configuration, said ring-like member being generally rectangular in cross-sectional configuration and including two opposed generally radially extending surfaces and two opposed generally axially extending surfaces connected between adjacent portions of said radially extending surfaces, a lobe being formed at each of the four corners defined between the adjacent surfaces, the exterior surface of each of said lobes in their free form being smoothly contoured and continuously arcuate in configuration, said generally radially extending surfaces each having a concavely shaped recess formed in the central portions thereof, each of said generally axially extending surfaces having a recess formed in the central portion thereof, the bottom surface of each of said last-mentioned recesses being substantially flat and extending a substantial distance in a direction parallel to the axis of said ring-like member, said member being of substantially greater axial cross-sectional dimension than radial cross-sectional dimension whereby substantially all rocking, rolling and twisting movement of such a member, when placed within a relatively wide groove formed in one of a pair of opposed surfaces having relative motion axially of the groove to provide a seal therebetween, is precluded.

References Cited in the file of this patent

UNITED STATES PATENTS

| | | |
|---|---|---|
| 2,841,429 | McCuistion | July 1, 1928 |

FOREIGN PATENTS

| | | |
|---|---|---|
| 760,310 | Great Britain | Oct. 31, 1956 |